United States Patent [19]

Vitale et al.

[11] Patent Number: 5,040,218

[45] Date of Patent: Aug. 13, 1991

[54] NAME PRONOUNCIATION BY SYNTHESIZER

[75] Inventors: Anthony J. Vitale, Northborough; Thomas M. Levergood, Bellingham; David G. Conroy, Maynard, all of Mass.

[73] Assignee: Digital Equipment Corporation, Maynard, Mass.

[21] Appl. No.: 551,045

[22] Filed: Jul. 6, 1990

Related U.S. Application Data

[63] Continuation of Ser. No. 275,581, Nov. 23, 1988, abandoned.

[51] Int. Cl.[5] .............................................. G01L 5/00

[52] U.S. Cl. .................................. 381/52; 364/513.5

[58] Field of Search .................................. 381/51-53; 364/513.5

[56] References Cited

U.S. PATENT DOCUMENTS 3,704,345 11/1972 Coker et al. .
4,278,838 7/1981 Antonov .
4,337,375 6/1982 Freeman .
4,689,817 8/1987 Kroon .
4,692,941 9/1987 Jacks et al. .

OTHER PUBLICATIONS

"Synthetic Speech Technology for Enhancement of Voice-Store-and Forward Systems" by Frank C. Liu and Larry J. Haas.

"Conversation with Computers" an article from The Institute, of Feb., 1988.

"Engineering Speech Systems to Meet Market Needs: Customer Name and Address Applications", Speech Tech, pp. 149-151, Speech Tech '87.

"Stress Assignment in Letter to Sound Rules for Speech Synthesis", Kenneth Church, Proc. of ACL, 1985, pp. 246-253.

"Pronouncing Surnames Automatically" by Murray G. Spiegel, Proceedings of the Voice I/O Application Conference (AVIOS), pp. 109-132.

"Syllable Structure and Stress in Spanish", James Harris, MIT Press, 1983.

"Bell System Technical Journal", vol. 57, No. 6 on Unix (vol. 1) by McMann et al., (1978).

*Primary Examiner*—Emanuel S. Kemeny
*Attorney, Agent, or Firm*—Kenyon & Kenyon

[57] ABSTRACT

An apparatus and method for correctly pronouncing proper names from text using a computer provides a dictionary which performs an initial search for the name. If the name is not in the dictionary, it is sent to a filter which either positively identifies a single language group or eliminates one or more language groups as the language group of origin for that word. When the filter cannot positively identify the language group of origin for the name, a list of possible language groups is sent to a grapheme analyzer which precedes a trigram analyzer. Using grapheme analysis, the most probable language group of origin for the name is determined and sent to a language-sensitive letter-to-sound section. In this section, the name is compared with language-sensitive rules to provide accurate phonemics and stress information for the name. The phonemics (including stress information) are sent to a voice realization unit for audio output of the name.

9 Claims, 2 Drawing Sheets

NAME PRONOUNCIATION BY SYNTHESIZER

This application is a continuation of application Ser. No. 07/275,581 filed Nov. 23, 1988, abandoned.

FIELD OF THE INVENTION

The present invention relates to text-to-speech conversion by a computer, and specifically to correctly pronouncing proper names from text.

BACKGROUND OF THE INVENTION

Name pronunciation may be used in the area of field service within the telephone and computer industries. It is also found within larger corporations having reverse directory assistance (number to name) as well as in text-messaging systems where the last name field is a common entity.

There are many devices commercially available which synthesize American English speech by computer. One of the functions sought for speech synthesis which presents special problems is the pronunciation of an unlimited number of ethnically diverse surnames. Due to the extremely large number of different surnames in an ethnically diverse country such as the United States, the pronouncing of a surname cannot be practically implemented at present by use of other voice output technologies such as audiotape or digitized stored voice.

There is typically an inverse relation between the pronunciation accuracy of a speech synthesizer in its source language and the pronunciation accuracy of the same synthesizer in a second language. The United States is an ethnically heterogeneous and diverse country with names deriving from languages which range from the common Indo-European ones such as French, Italian, Polish, Spanish, German, Irish, etc. to more exotic ones such as Japanese, Armenian, Chinese, Arabic, and Vietnamese. The pronunciation of surnames from the various ethnic groups does not conform to the rules of standard American English. For example, most Germanic names are stressed on the first syllable, whereas Japanese and Spanish names tend to have penultimate stress, and French names, final stress. Similarly, the orthographic sequence CH is pronounced [č]; in English names (e.g. CHILDERS), [š] in French names such as CHARPENTIER, and [k] in Italian names such as BRONCHETTI. Human speakers often provide correct pronunciation by "knowing" the language of origin of the name. The problem faced by a voice synthesizer is speaking these names using the correct pronunciation, but since computers do not "know" the ethnic origin of the name, that pronunciation is often incorrect.

A system has been proposed in the prior art in which a name is first matched against a number of entries in a dictionary which contains the most common names from a number of different language groups. Each dictionary entry contains an orthographic form and a phonetic equivalent. If a match occurs, the phonetic equivalent is sent to a synthesizer which turns it into an audible pronunciation for that name.

When the name is not found in the dictionary, the proposed system used a statistical trigram model. This trigram analysis involved estimating a probability that each three letter sequence (or trigram) in a name is associated with an etymology. When the program saw a new word, a statistical formula was applied in order to estimate for each etymology a probability based on each of the three letter sequences (trigrams) in the word.

The problem with this approach is the accuracy of the trigram analysis. This is because the trigram analysis computes only a probability, and with all language groups being considered as a possible candidate for the language group of origin of a word, the accuracy of the selection of the language group of origin of the word is not as high as when there are fewer possible candidates.

SUMMARY OF THE INVENTION

The present invention solves the above problem by improving the accuracy of the trigram analysis. This is done by providing a filter which either positively identifies a language group as the language group of origin, or eliminates a language group as a language group of origin for a given input word. The filtering method according to the present invention comprises identifying or eliminating a language group as a language group of origin for an input word according to a stored set of filter rules. The step of identifying or eliminating a language group includes performing an exhaustive search of the rule set using a right-to-left scan. Language groups are eliminated when a match of one of these substrings to one of the filter rules indicates that a language group should be eliminated from consideration as the language group of origin for the input word. This is done until a match of one of the substrings to one of the rules positively identifies a language group. When no language group is positively identified as a language group of origin after all of the substrings for a given input word are compared, a list of possible language groups of origin is produced. This filter method also produces a positively identified language group of origin when there is a positive identification.

The advantages of using a filter before the trigram analysis includes avoiding unnecessary trigram analysis when filter rules can positively identify a language group as a language group of origin. When no language group can be positively identified, the filtering method also reduces the chances of an incorrect guess being made in the trigram analysis by reducing the number of possible language groups in consideration as the language group of origin. Through the elimination of some language groups, the identification of a language group of origin is more accurate, as discussed above.

The invention also includes a method for generating correct phonemics for a given input word according to the language group of origin of the input word. This method comprises searching a dictionary for an entry corresponding to an input word, each entry containing a word and phonemics for that word. This entry is then sent to a voice realization unit for pronunciation when the dictionary search reveals an entry corresponding to the input word. The input word is sent to a filter when the input word does not have a corresponding entry in the dictionary.

The next step in the method involves filtering to identify a language group of origin for the input word or to eliminate at least one language group of origin for the input word. When the filter positively identifies a language group of origin for the input word, the input word and a language tag indicating a language group of origin for the input word is sent from the filter to a letter-to-sound module. When a language group of origin is not positively identified by the filter, the input word and any language groups not eliminated are sent from the filter to a trigram analyzer.

A most probable language group of origin for the input word is produced by analyzing trigrams occurring in the input word. This most probable language group of origin produced by the trigram analysis is sent along with the input word to a subset of letter-to-sound rules that correspond to the most probable language group. Phonemics are generated for the input word according to the corresponding subset of letter-to-sound rules.

DETAILED DESCRIPTION

Figure 1:
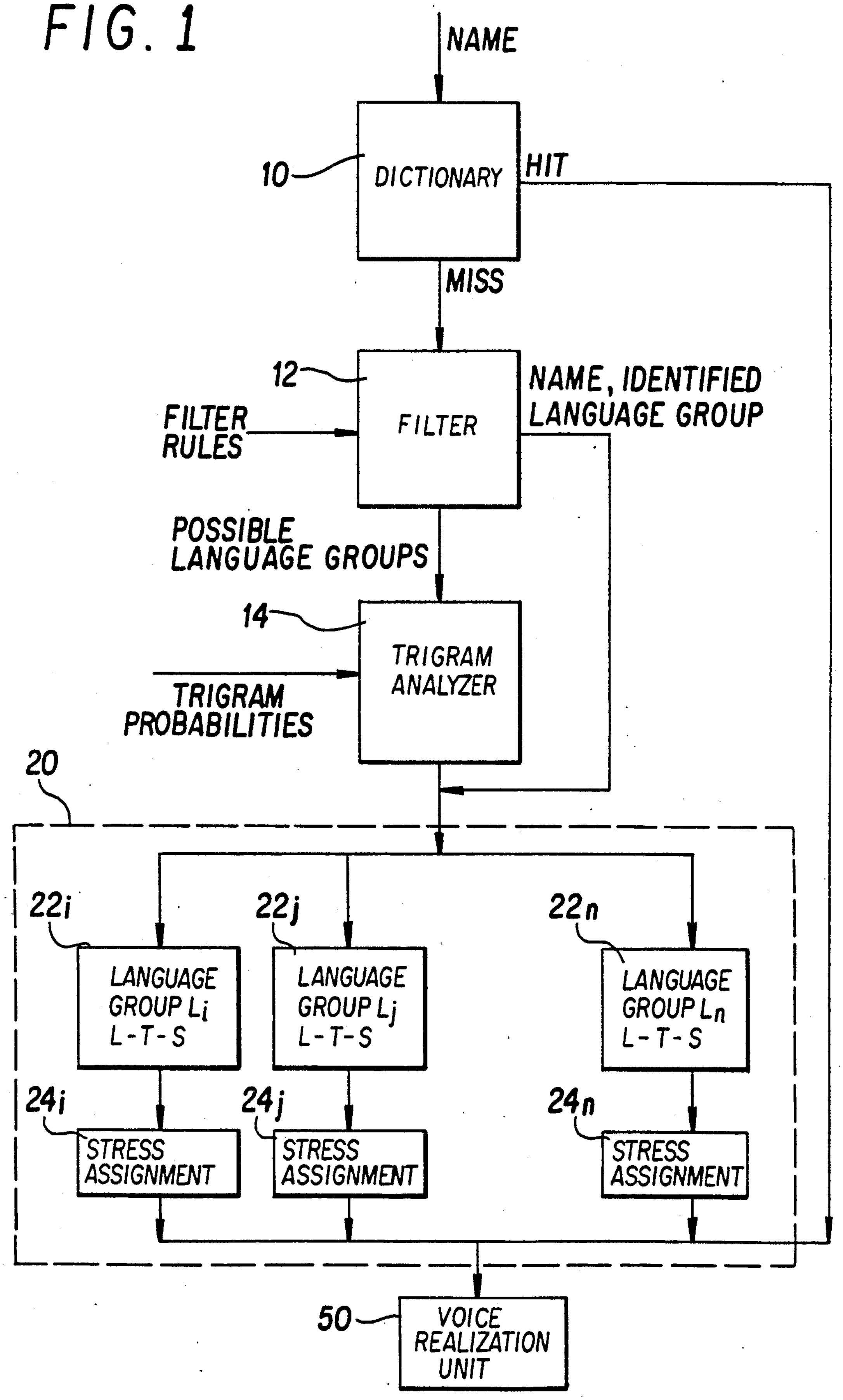
FIG. 1 illustrates a logic block diagram of language identification and phonemics realization modules.

FIG. 1 is a diagram illustrating the various logic blocks of the present invention. The physical embodiment of the system can be realized by a commercially available processor logically arranged as shown.

A name to be pronounced is accepted as an input. The search is made through entries in a dictionary 10 for this input name. Each dictionary entry has a name and phonemics for that name. A semantic tag identifies the word as being a name.

A search for an input name that corresponds to an entry in the dictionary 10 results in a hit. The dictionary 10 will then immediately send the entry (name and phonemics) to a voice realization unit 50, which pronounces the name according to the phonemics contained in the entry. The pronunciation process for that input word would then be complete.

A dictionary miss occurs when there is no entry corresponding to the input name in the dictionary 10. In order to provide the correct pronunciation, the system attempts to identify the language group of origin of the input name. This is done by sending to a filter 12 the input name which missed in the dictionary 10. The input name is analyzed by the filter 12 in order to either positively identify a language group or eliminate certain language groups from further consideration.

The filter 12 operates to filter out language groups for input names based on a predetermined set of rules. These rules are provided to the filter 12 by a rule store described later.

Each input name is considered to be composed of a string of graphemes. Some strings within an input name will uniquely identify (or eliminate) a language group for that name. For example, according to one rule the string BAUM positively identifies the input name as German, (e.g. TANNENBAUM). According to another rule the string MOTO at the end of a name positively identifies the language group as Japanese (e.g. KAWAMOTO). When there is such a positive identification, the input name and the identified language group (L TAG) are sent directly to a letter-to-sound section 20 that provides the proper phonemics to the voice realization unit 50.

The filter 12 otherwise attempts to eliminate as many language groups as possible from further consideration when positive identification is not possible. This increases probability accuracy of the remaining analysis of the input name. For example, a filter rule provides that if the string -B is at the end of a name, language groups such as Japanese, Slavic, French, Spanish and Irish can be eliminated from further consideration. By this elimination, the following analysis to determine the language group of origin for an input name not positively identified is simplified and improved.

Assuming that no language group can be positively identified as the language group of origin by the filter 12, further analysis is needed. This is performed by a trigram analyzer 14 which receives the input name and filter 12. The trigram analyzer 14 parses the string of graphemes (the input name) into trigrams, which are grapheme strings that are three graphemes long. For example, the grapheme string #SMITH# is parsed into the following five trigrams: #SM, SMI, MIT, ITH, TH#. For trigram analysis, the pound-sign (word-boundary) is considered a grapheme. Therefore, the number of trigrams is always the same as the number of graphemes in the name.

The probability for each of the trigrams being from a particular language group is input to the trigram analyzer 14. This probability, computed from an analysis of a name data base, is received as an input from a frequency table of trigrams for each language group that was not eliminated by the filter 12. The same thing is also done for each of the other trigrams of the grapheme string.

The following (partial) matrix shows sample probabilities for the surname VITALE:

| | Li | Lj | . . . | Ln |
|---|---|---|---|---|
| #VI | .0679 | .4659 | | .2093 |
| VIT | .0263 | .4145 | | .0000 |
| ITA | .0490 | .7851 | | .0564 |
| TAL | .1013 | .4422 | | .2384 |
| ALE | .0867 | .2602 | | .2892 |
| LE# | .1884 | .3181 | | .0688 |
| Total Prob. | .0866 | .4477 | | .1437 |

In the array above, L is a language group and n is the number of language groups not eliminated by the filter 12. The trigram #VI has a probability of 0.0679 of being from language group Li, 0.4659 of being from the language group Lj and 0.2093 of being from language group Ln. Lj is averaged as the highest probability and thus the language group is identified.

The probability of each of the trigrams of the grapheme string (input name) is similarly input to the trigram analyzer 14. The probability of each trigram in an input name is averaged for each language group. This represents the probability of the input name originating from a particular language group. The probability that the grapheme string #VITALE# belongs to a particular language group is produced as a vector of probabilities from the total probability line. From this vector of probabilities, other items such as standard deviation and thresholding can also be calculated. This ensures that a single trigram cannot overly contribute to or distort the total probability.

Although the illustrated embodiment analyzes trigrams, the analyzer 14 can be configured to analyze different length grapheme strings, such as two-grapheme or four-grapheme strings.

In the example above, the trigram analyzer 14 shows that language group $L_j$ is the most probable language group of origin for the given input name, since it has the highest probability. It is this most probable language group that becomes the L TAG for the input name. The L TAG and the input name are then sent to the letter-to-sound section 20 to produce the phonemics for the input.

The filter rules are constructed in such a way that ambiguity of identification is not possible. That is, a language may not be both eliminated and positively identified since a dominance relationship applies such that a positive identification is dominant over an elimination rule in the unlikely event of a conflict.

Similarly, a language group may not be positively identified for more than one language because the filter rules constitute an ordered set such that the first positive identification applies.

The system may default to a certain language group if one of two thresholding criteria is met: (a) absolute thresholding occurs when the highest probability determined by the trigram analyzer 14 is below a predetermined threshold Ti. This would mean that the trigram analyzer 14 could not determine from among the language groups a single language group with a reasonable degree of confidence; (b) relative thresholding occurs when the difference in probabilities between the language group identified as having the highest probability and the language group identified as having the second highest probability falls below a threshold Tj as determined by the trigram analyzer 14.

The default to a specified language group is a settable parameter. In an English-speaking environment, for example, a default to an English pronunciation is generally the safest course since a human, given a low confidence level, would most likely resort to a generic English pronunciation of the input name. The value of the default as a settable parameter is that the default would be changed in certain situations, for example, where the telephone exchange indicates that a telephone number is located in a relatively homogeneous ethnic neighborhood.

As mentioned earlier, the name and language tag (LTAG) sent by either the filter 12 or the trigram analyzer 14 is received by the letter-to-sound rule section 20. The letter-to-sound rule section 20 is broken up conceptually into separate blocks for each language group. In other words, language group ($L_i$) will have its own set of letter-to-sound rules, as does language group ($L_j$), language group ($L_k$) etc. to language group ($L_n$).

Assuming that the input name has been identified sufficiently so as not to generate a default pronunciation, the input name is sent to the appropriate language group letter-to-sound block 22$_{i-n}$ according to the language tag associated with the input name.

In the letter-to-sound rule section 20, the rules for the individual language group blocks 22 are subsets of a larger and more complex set of letter-to-sound rules for other language groups including English. A letter-to-sound block 22$_i$ for a specific language group $L_i$ that has been identified as the language group of origin will attempt to match the largest grapheme sequence to a rule. This is different from the filter 12 which searches top to bottom, and in this embodiment right to left, for the string of graphemes in an input name that fits a filter rule. The letter-to-sound block 22$_{i-n}$ for a specific language scans the grapheme string from left to right or right to left, the illustrated embodiment using a right to left scan.

An example of the letter-to-sound rules for a specific block $L_i$ can be seen for a name such as MANKIEWICZ. This input name would be identified as originating from the Slavic language group, having the highest probability, and would therefore be sent to the Slavic letter-to-sound rules block 22$_i$. In that block 22$_i$, the grapheme string -WICZ has a pronunciation rule to provide the correct segmental phonemics of the string. However, the grapheme string -KIEWICZ also has a rule in the Slavic rule set. Since this is a longer grapheme string, this rule would apply first. The segmental phonemics for any remaining graphemes which do not correspond to a language specific pronunciation rule will then be determined from the general pronunciation block. In this example, the segmental phonemics for the graphemes M, A, and N would be determined (separately) according to the general pronunciation rules. The letter-to-sound block 22$_i$ sends the concatenated phonemics of both the language-sensitive grapheme strings and the non-language-sensitive grapheme strings together to the voice realization unit 50 for pronunciation.

The filter 12 does not contain all of the larger strings which are language specific that are in the letter-to-sound rules 20. The larger strings are not all needed since, for example, the string-WICZ would positively identify an input name as Slavic in origin. There is then no need for the string -KIEWICZ filter rule, since -WICZ is a subset of -KIEWICZ and thus would identify the input name.

The letter-to-sound module outputs the phonemics for names mainly in the form of segmental phonemic information. The output of the letter-to-sound rule blocks 22$_{i-n}$ serve as the input to stress sections 24$_{i-n}$. These stress sections 24$_{i-n}$ take the LTAG along with the phonemics produced by individual letter-to-sound rule blocks 22$_{i-n}$ and output a complete phonemic string containing both segmental phonemes (from letter-to-sound rule blocks 22$_{i-n}$) and the correct stress pattern for that language For example, if the language identified for the name VITALE was Italian, and letter-to-sound rule block 22 provided the phoneme string [vitáli], then the stress section 24$_i$ would place stress on the penultimate syllable so that the final phonemic string would be [vitáli].

It should be noted that the actual rules used in the filter 12, in the letter-to-sound section 20, and the stress sections 24$_{i-n}$ are rules which are either known or easily acquired by one skilled in the art of linguistics.

The system described above can be viewed as a front end processor for a voice realization unit 50. The voice realization unit 50 can be a commercially available unit for producing human speech from graphemic or phonemic input. The synthesizer can be phoneme-based or based on some other unit of sound, for example diphone or demi-syllable. The synthesizer can also synthesize a language other than English.

Figure 2:
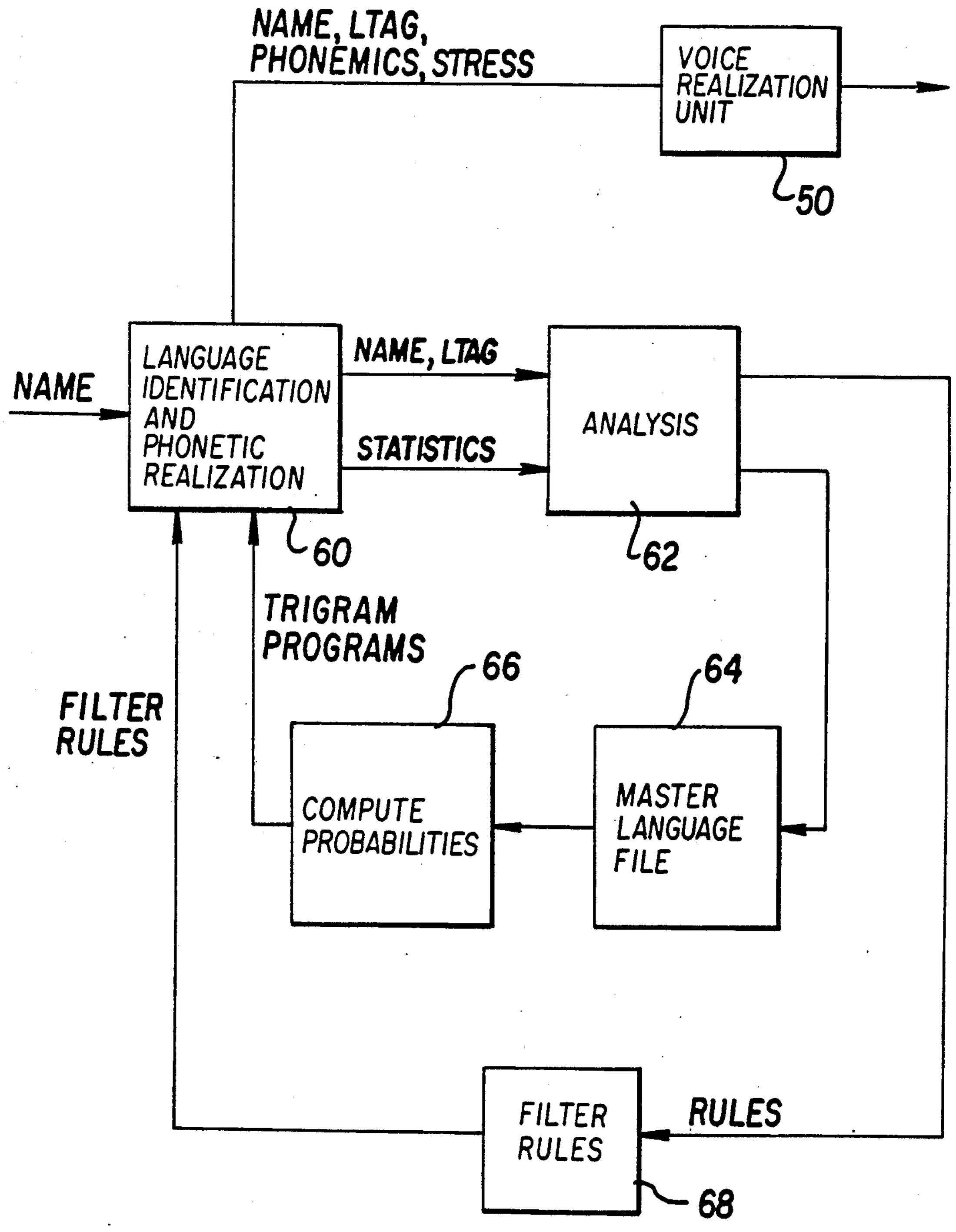
FIG. 2 shows a logic block diagram of a name analysis system containing the language group identification and phonemic realization module of FIG. 1, constructed in accordance with the present invention.

FIG. 2 shows a language group identification and phonetic realization block 60 as part of a system. The language group identification and phonetic realization block 60 is made up of the functional blocks shown in FIG. 1. As shown, the input to the language identification and phonetic realization block 60 is the name, the filter rules and the trigram probabilities. The output is the name, the language tag and phonemics, which are sent to the voice realization unit 50. It should be noted that phonemics means in this context, any alphabet of sound symbols including diphones and demi-syllables.

The system according to FIG. 2 marks grapheme strings as belonging to a particular language group. The language identifier is used to pre-filter a new data base in order to refine the probability table to a particular data base. The analysis block 62 receives as inputs the name and language tag and statistics from the language identification and phonetic realization block 60. The analysis block takes this information and outputs the name and language tag to a master language file 64 and produces rules to a filter rule store 68. In this way, the data base of the system is expanded as new input names are processed so that future input names will be more easily processed. The filter rule store 68 provides the filter rules to the filter 12 and the language identification and phonetic realization block 60.

The master file contains all grapheme strings and their language group tag. This block 64 is produced by the analysis block 62. The trigram probabilities are arranged in a data structure 66 designed for ease of searching for a given input trigram. For example, the illustrated embodiment uses an N-deep three dimensional matrix where n is the number of language groups.

Trigram probability tables are computed from the master file using the following algorithm:

```
compute total number of occurrences of each trigram for
all language groups L (1-N);
        for all grapheme strings S in L
                for all trigrams T in S
                        if (count [T][L] = 0)
                                uniq [L] + = 1
                        count [T][L] + = 1
for all possible trigrams T in master
        sum = 0
        for all language groups L
                sum + = count [T][L]/uniq[L]
        for all language groups L
                if sum >0,prob[T][L]=count [T][L]/uniq[L]/sum
                else prob[T][L]=0.0;
```

The trigram frequency table mentioned earlier can be thought of as a three-dimensional array of trigrams, language groups and frequencies. Frequencies means the percentage of occurrence of those trigram sequences for the respective language groups based on a large sample of names. The probability of a trigram being a member of a particular language group can be derived in a number of ways. In this embodiment, the probability of a trigram being a member of a particular language group is derived from the well-known Bayes theorem, according to the formula set forth below:

Bayes' Rules states that the probability that Bj occurs given A, P(Bj|A), is $$P(Bj|A) = \frac{P(A|Bj)P(Bj)}{\sum_i P(A|Bi)P(Bi)}$$

More specific to the problem, the probability a language group given a trigram, T, is P(Li|T), where $$P(Li|T) = \frac{P(T|Li)P(Li)}{\sum_k P(T|L_k)P(L_k)}$$

analyzing further $$P(T|Li) = \frac{X}{Y}$$

where

X=number of times the token, T, occurred in the language group, Li

Y=number of uniquely occurring tokens in the language group, Li $P(L_i)=1/N$ always where N=number of language groups (nonoverlapping)

$$\therefore P(L_i|T) = \frac{\frac{P(T|L_i)}{N}}{\sum_{k=1}^{N} \frac{P(T|L_k)}{N}} = \frac{P(T|L_i)}{\sum_{k=1}^{N} P(T|L_k)}$$

The final table then has four dimensions; one for each grapheme of the trigram, and one for the language group.

The trigram probabilities as computed by the block 66 are sent to the language identification and phonetic realization block 60, and particularly to the trigram analyzer 14 which produces the vector of probabilities that the grapheme string belongs to a particular language group.

Using the above-described system, names can be more accurately pronounced. Further developments such as using the first name in conjunction with the surname in order to pronounce the surname more accurately are contemplated. This would involve expanding the existing knowledge base and rule sets.

What is claimed is:

1. A method for determining if any of a plurality of language groups may be identified, or removed from consideration, as a language group of origin for an input word using a programmable computer, the method comprising the steps of:

(a) applying a set of filter rules, which are stored in memory means of the programmable computer, to predetermined substrings of graphemes of the input word to determine if there is a match between one of the substrings and one of the filter rules of a particular language group which positively identifies the input word as being part of a that language group, or if there is an absence of a match between any of the predetermined substrings of graphemes of the input word and the filter rules for a particular language group of the plurality of language groups so as to eliminate that particular language group from consideration as a language group of origin of the input word, with the filter rules for each language group of the plurality of language groups including N graphemes where 1<N≦R and R=the number of graphemes in the input word; and (b) generating a representative indicator of the language group of origin of the input word if there is a match or generating a list of possible language groups of origin for the input word according to the filter rules when there is the absence of a match.

2. The method as recited in claim 1, wherein the applying step includes searching the filter rules from top to bottom and right to left.

3. A method for generating correct phonemics for an input word according to a language group of origin using a programmable computer, the method comprising the steps of:

(a) inputting the input word to the programmable computer;

(b) searching a dictionary stored in memory means of the programmable computer for a match between the input word and a dictionary entry, with each dictionary entry including a word and phonemics for that word, and sending contents of a dictionary entry in which the word of that entry matches the input word to a voice realization means for pronunciation, or processing the input word according to the step (c) if there is an absence of a match between the input word and a dictionary entry;

(c) applying a set of filter rules, which are stored in memory means of the programmable computer, to predetermined substrings of graphemes of the input word, with the filter rules for each language group of the plurality of language groups including N graphemes where $1<N\leqq R$ and $R=$the number of graphemes in the input word, and with the applying step being for, (1) determining if there is a match between one of the predetermined set of graphemes of the input word substrings and one of the filter rules identifiable with one of the plurality of language groups which positively identifies the input word as being part of a particular language group and thereafter processing input word according to step (d), or (2) determining if there is an absence of a match between any of the predetermined substrings of graphemes of the input word and the filter rules for a particular language group of the plurality of language groups so as to eliminate that particular language group from consideration as a language group of origin of the input word and if there is the absence of match, generating a list of possible language groups of origin of the input word, and thereafter processing the input word according to step (e);

(d) transmitting the input word and a language tag indicative of the language group of origin identified at substep (c) (1) to a letter-to-sound means in the programmable computer, with the letter-to-sound means including letter-to-sound rules, and further processing the input word according to step (g);

(e) transmitting the input word and the list of possible language groups of origin of the input word to a grapheme analyzer in the programmable computer and determining a most probable language group of origin from the list generated at substep (c) (2) by examining graphemes of the input word of a predetermined length;

(f) transmitting the input word and the most probable language group of origin determined at step (e) to the letter-to-sound means;

(g) generating in the letter-to-sound means according to the letter-to-sound rules segmental phonemics for the input word and further processing the input word according to step (h);

(h) transmitting the segmental phonemics and a language tag to a stress assignment means of the programmable computer and generating in the stress assignment means stress assignment information for the input word; and (i) transmitting the segmental phonemics and the stress assignment information to the voice realization means.

4. The method as recited in claim 3, wherein the graphemes of a predetermined length are trigrams.

5. The method as recited in claim 3, wherein step (e) further includes computing probabilities for graphemes of the input word being from a particular language group according to Bayes' Rule.

6. The method as recited in claim 3, wherein the method further comprises selecting a predetermined default pronunciation if the most probable language group of origin determined at step (e) has a probability below a predetermined threshold.

7. The method as recited in claim 3, wherein the method further comprises selecting a predetermined default pronunciation if the most probable language group of origin determined at step (e) has a probability that exceeds a probability of a next most probable group of origin by less than a predetermined amount.

8. An apparatus that is capable of being embodied in a programmable computer for determining if any of a plurality of language groups may be identified, or removed from consideration, as a language group of origin for a given word, comprising:

filter rule store means for storing filter rules;

comparator means that are used for determining if there is a match between a predetermined substring of graphemes of an input word and one of the filter rules identifiable with one of a plurality of language groups which positively identifies the input word as being part of a specific language group, or if there is an absence of a match between any of the predetermined substrings of graphemes of the input word and the filter rules of a particular language group of the plurality of language groups so as to eliminate that particular language group from consideration as a language group from consideration as a language group of origin of the input word, with the filter rules for each language group of the plurality of language groups including N graphemes where $1 <N\leqq R$ and $R=$the number of graphemes in the input word; and output means of the comparator means for outputting therefrom at least a list of possible language groups of origin if there is an absence of a match between a predetermined substring of graphemes and the input word, or the language group of origin if there is a match between a predetermined substring of graphemes and the input word.

9. A method for processing an input word before trigram analysis for determining if any of a plurality of language groups may be identified, or eliminated from consideration, as a language group of origin for the input word, the method comprising applying a set of filter rules, which are stored in memory means of a programmable computer, to predetermined substrings of graphemes of the input word to determine if there is a match between one of the substrings and one of the filter rules identifiable with one of the plurality of language groups which positively identifies the input word as being part of a specific language group, or if there is an absence of a match between any of the predetermined substrings of graphemes of the input word and the filter rules for a particular language group of the plurality of language groups so as to eliminate that particular language group from consideration as a language group of origin of the input word, with the filter rules for each language group of the plurality of language groups including N graphemes where $1\leqq N\leqq R$ and $R =$the number of graphemes in the input word.

* * * * *